(No Model.)
B. KERSTING.
NECKTIE FASTENER.
No. 479,884. Patented Aug. 2, 1892.
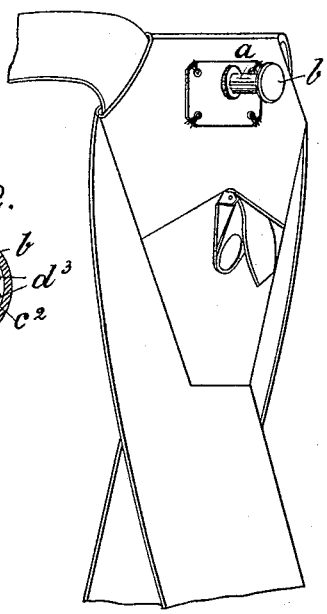
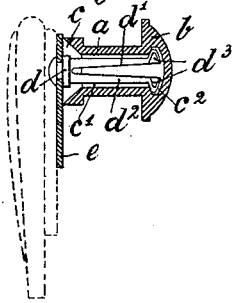
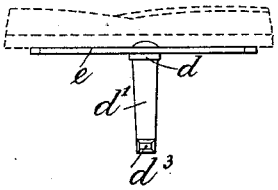
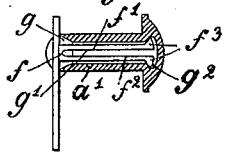
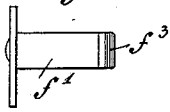
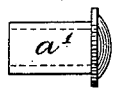
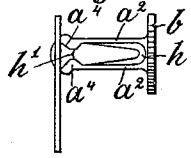
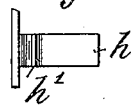
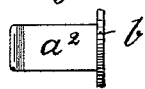
Witnesses
F. Kollm
Alfred Meister
Inventor
Bernhard Kersting
by his Attorney
Edwin A. Brydges

UNITED STATES PATENT OFFICE.

BERNHARD KERSTING, OF OVELGÖNNE, GERMANY.

NECKTIE-FASTENER.

SPECIFICATION forming part of Letters Patent No. 479,884, dated August 2, 1892.

Application filed March 28, 1892. Serial No. 426,765. (No model.)

*To all whom it may concern:*

Be it known that I, BERNHARD KERSTING, watchmaker, a subject of the German Emperor, and a resident of Ovelgönne, Oldenburg, in the German Empire, have invented a certain new and useful Improved Device for Attaching Neckties, of which the following is a full, clear, and exact specification.

My invention relates to a device for attaching neckties to the collar in convenient manner, said device further preventing the displacement or loss of the tie.

My invention consists, mainly, of a stud which is inserted into the shirt-front and is provided with a hollow or tubular stem having an enlarged recess at its inner end. The tie is provided with a split pin or stem having small projections on its ends, both limbs being elastic, so that they can be pressed together and inserted into the hollow shirt-stud, and will, when fully inserted, expand, pressing their projections into the recessed interior end of the stud, and thus securely connecting the hollow stud with the limbs of the pin or stem.

In order to make this specification more easily intelligible, I refer to the accompanying drawings, in which similar letters denote similar parts throughout the several views.

Figure 1 shows in perspective view a tie provided with my improved fastening. Fig. 2 is a section through the stud and pin. Fig. 3 is a plan of the pin. Figs. 4, 5, and 6 show a flat button and pin in section, side elevation, and plan, respectively. Figs. 7, 8, and 9 show in section, side elevation, and plan a modification in which the pin is rigid and the stud elastic.

The stud which is inserted in the shirt-front has a flat, round, or other shaped hollow or tubular part $a$, provided with a round or flat disk $b$, the boring $c'$ of the stem being increased or extended at the rear end $c^2$, so as to form a cavity into which the catches or projections $d^3$ of the pin or stem $d$ of the fastening which is attached to the tie may engage. The stud $a$ is bored or reamed out conically at the front end $c$ to enable the more convenient insertion of the pin or stem $d$. The latter is split to form the two spring-catches $d'$ $d^2$, having hooks $d^3$, the whole being mounted on the plate $e$, which is sewed to the tie or attached in any other convenient manner to the same.

The device is manipulated in the following manner: The stud is arranged in the shirt-front and the pin of the tie inserted in the boring of the same, when the catches $d^3$ will engage in the recess $c^3$ and hold the tie in place. To remove the tie, it is only necessary to pull the pin sharply out of the stud.

Figs. 4, 5, and 6 show a modification in which the shank of the stud $a'$ is flat, as also the pin $f$, having spring-limbs $f'$ $f^2$ and hooks $f^3$. The boring is recessed at the interior end at $g^2$, and made conical in front at $g$. The section of the stud is in this case not round, but rectangular or oval, as may be desired.

Figs. 7, 8, and 9 show a modified form of my invention, in which the pin $h$ is solid and provided with a groove $h'$, while the stem of the stud is formed of two springs $a^2$ $a^3$, each having a catch $a^4$, engaging in the groove $h'$ of the pin. The drawings show this form of my device in connection with a flat stud-shank; but it is obvious that the same can also be of circular section, it only being necessary to split the stud-stem to allow of the necessary elasticity.

In order to simplify the manufacture of the studs, the parts $a$ and $b$ of the same may be made separately and screwed together.

The device hereinbefore described entirely obviates the necessity of elastic loops or other fastenings on the ties, and also prevents the tie from getting displaced. The stud also serves for fastening the shirt.

Having now fully described my said invention, what I claim, and desire to secure by Letters Patent, is—

In a necktie-fastener, the combination, with the stud $a$, reamed conically at the front end $c$ and having cavity $c^2$ at the rear end, the stem $d$, adapted to be inserted therein, said stem being split to form the spring-catches $d'$ $d^2$ and having hooks $d^3$, the plate $e$ on which they are mounted, said plate being attached to the tie, substantially as set forth.

In witness whereof I have hereunto signed my name in the presence of two subscribing witnesses.

BERNHARD KERSTING.

Witnesses:
 GEORG CORDES,
 HEINRICH WESSETS,
  *Both of Ovelgönne.*